(12) United States Patent
Mosher et al.

(10) Patent No.: US 9,976,457 B2
(45) Date of Patent: May 22, 2018

(54) TURBO PCV VALVE

(71) Applicant: Miniature Precision Components, Inc., Walworth, WI (US)

(72) Inventors: James J. Mosher, Milton, WI (US); Jonathan Bunne, Elkhorn, WI (US); Oscar Davison, Walworth, WI (US)

(73) Assignee: MINIATURE PRECISION COMPONENTS, INC., Walworth, WI (US)

( * ) Notice: Subject to any disclaimer, the term of this patent is extended or adjusted under 35 U.S.C. 154(b) by 9 days.

(21) Appl. No.: 15/584,291

(22) Filed: May 2, 2017

(65) Prior Publication Data

US 2017/0234178 A1    Aug. 17, 2017

Related U.S. Application Data

(63) Continuation-in-part of application No. 14/020,826, filed on Sep. 7, 2013, now Pat. No. 9,670,806.

(60) Provisional application No. 61/698,207, filed on Sep. 7, 2012.

(51) Int. Cl.
| | |
|---|---|
| *F02B 25/06* | (2006.01) |
| *F01M 13/00* | (2006.01) |
| *G05D 7/01* | (2006.01) |

(52) U.S. Cl.
CPC ......... *F01M 13/0011* (2013.01); *G05D 7/014* (2013.01); *G05D 7/0133* (2013.01)

(58) Field of Classification Search
CPC .. E21B 43/123; F02D 9/1055; F01M 13/0011
USPC ....................................................... 123/574
See application file for complete search history.

(56) References Cited

U.S. PATENT DOCUMENTS

| | | | | |
|---|---|---|---|---|
| 3,111,138 | A * | 11/1963 | Humphreys | ......... F01M 13/023 123/574 |
| 3,359,960 | A | 12/1967 | Pittsley | |
| 3,766,898 | A | 10/1973 | McMullen | |
| 4,056,085 | A * | 11/1977 | Nowroski | ............ F01M 13/023 123/574 |
| 5,586,541 | A * | 12/1996 | Tsai | ..................... F01M 13/023 123/574 |
| 5,947,171 | A | 9/1999 | Woodruff | |
| 6,546,921 | B1 * | 4/2003 | Callahan | ............ F01M 13/0011 123/573 |
| 6,575,022 | B1 | 6/2003 | Schneider et al. | |
| 6,807,958 | B2 | 10/2004 | Kabat et al. | |
| 7,422,612 | B2 | 9/2008 | Pietschner | |
| 7,775,198 | B2 * | 8/2010 | Shieh | ..................... F02M 25/06 123/563 |
| 8,042,529 | B2 * | 10/2011 | Meinig | .................. B01D 45/08 123/572 |
| 9,212,718 | B2 * | 12/2015 | Heyn | ........................ F16F 9/46 |
| 2008/0035221 | A1 | 2/2008 | Gawryjolek | |

(Continued)

*Primary Examiner* — Marguerite McMahon
*Assistant Examiner* — James Kim
(74) *Attorney, Agent, or Firm* — Dickinson Wright PLLC

(57) ABSTRACT

A PCV valve that regulates the flow of gases to a turbocharger. A spring biased plunger member is used to restrict and meter the flow of gases through the PCV valve. The plunger member can include an axially extending through opening extending through the length of the plunger member to allow back flow of gases to be routed to the turbocharger. The through opening can be selectively opened and closed by a valve module contained in the plunger member.

20 Claims, 9 Drawing Sheets

(56) References Cited

U.S. PATENT DOCUMENTS

2009/0205123 A1 8/2009 Forrest
2009/0223498 A1 9/2009 Shieh

* cited by examiner

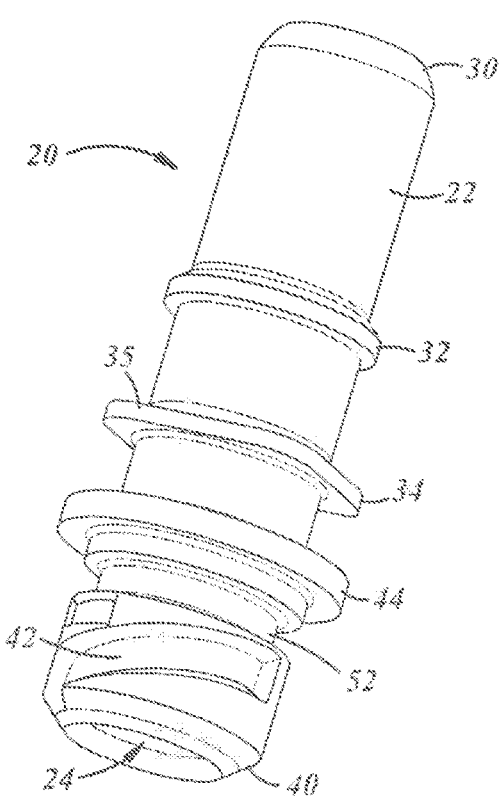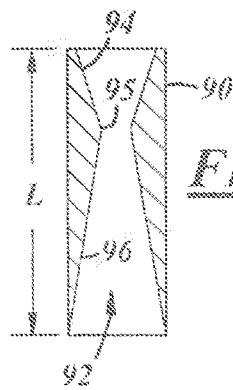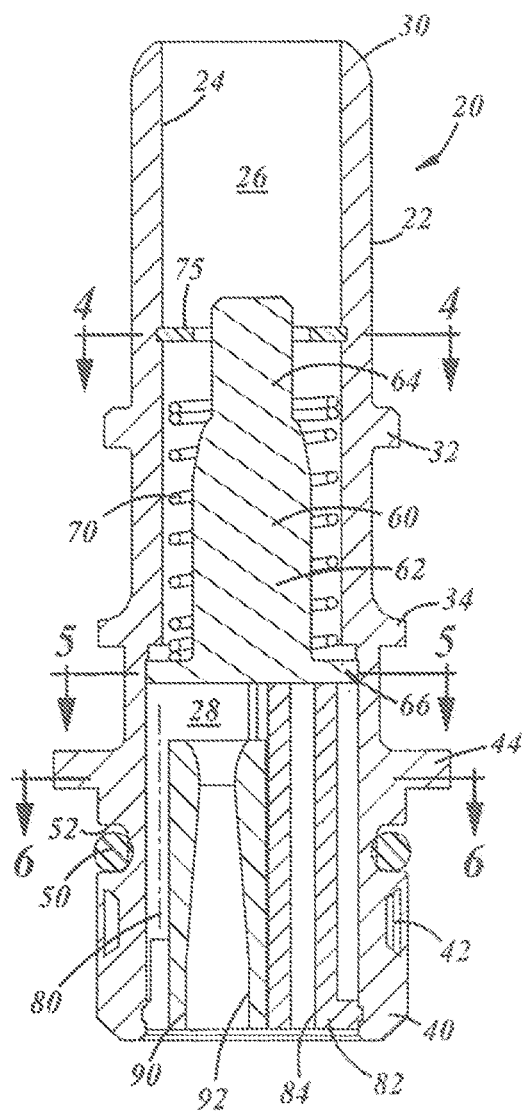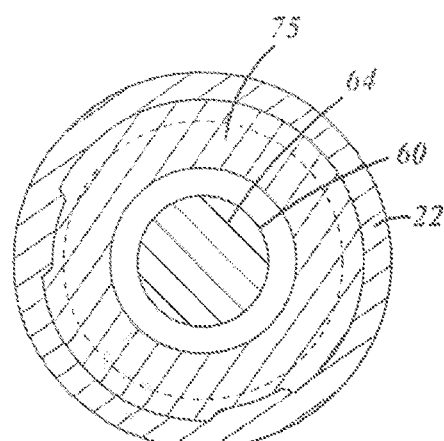

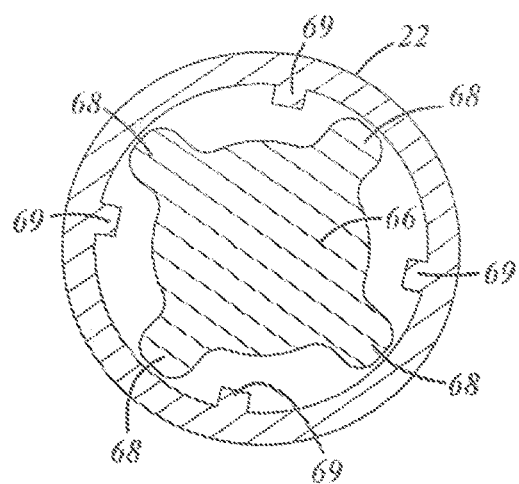
FIG. 5
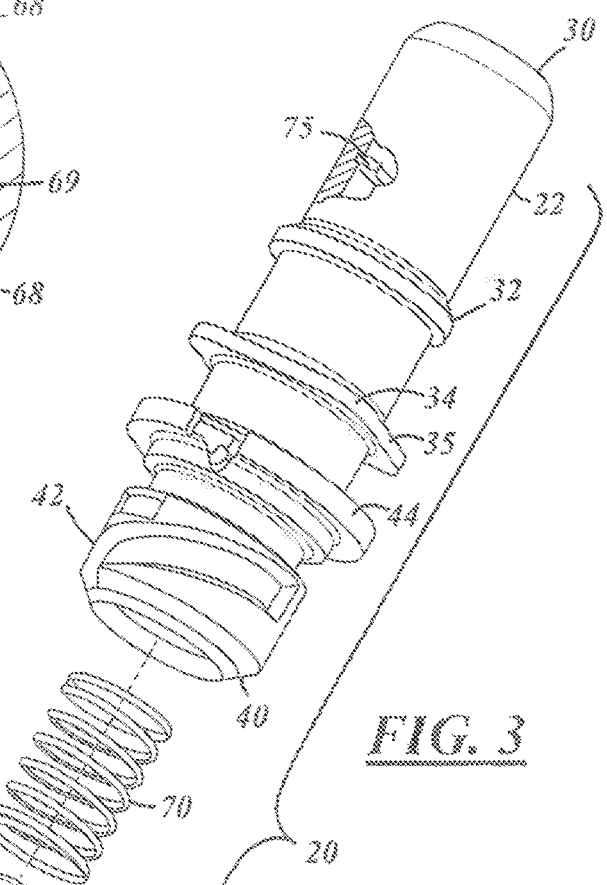
FIG. 3
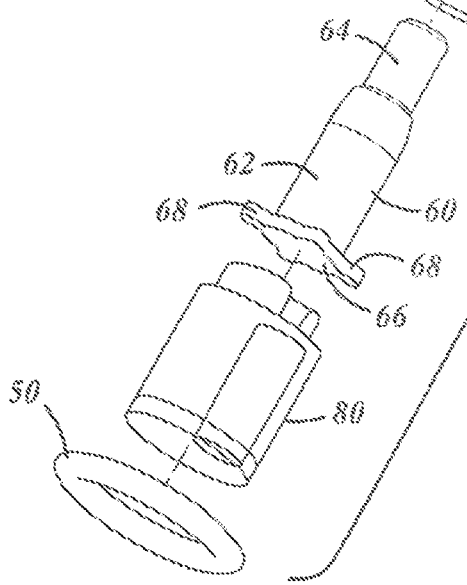
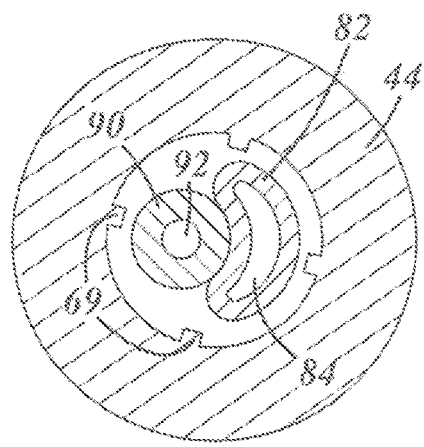
FIG. 6

TURBO PCV VALVE

CROSS-REFERENCE TO RELATED APPLICATIONS

This continuation-in-part application claims priority to U.S. application Ser. No. 14/020,826, filed Sep. 7, 2013, which claims the benefit of U.S. Provisional Application Ser. No. 61/698,207, filed Sep. 7, 2012, which are all incorporated herein by reference in their entirety.

TECHNICAL FIELD

The present invention relates to PCV valves, particularly for use with engines with turbochargers.

BACKGROUND OF THE INVENTION

The Positive Crankcase Ventilation (PCV) valve is a part of the PCV system where the engine passes harmful crankcase combustion gases to the air intake. Instead of venting the crankcase gases to the atmosphere, they are fed into the intake manifold where they can be re-entered into the engine combustion chambers as part of the air/fuel mixture and burned. This results in lower pollution and extended engine oil life. PCV valves act as both a crankcase ventilation system and as a pollution control device.

The PCV valve performs a complicated, but necessary, control function and can act to restrict the amount of air passing through it. When the engine is running under light loads, the intake manifold air pressure is less than the crankcase air pressure. Under these conditions, the crankcase gases are drawn through the PCV valve and into the intake manifold.

At idle, the intake manifold vacuum is near maximum. This results in the least amount of blow-by and the PCV valve provides the largest amount of restriction. As engine load increases, vacuum on the valve decreases proportionally and blow-by increases proportionally. At a low level of vacuum, the PCV valve allows more air flow.

When the engine is running at wide open throttle, the manifold pressure is about the same level as the engine crankcase, and the function of the PCV valve is minimal. When the manifold pressure is considerably higher than that of the crankcase, the PCV valve is closed to prevent reversal of the exhausted gases back into the crankcase.

The operation of a turbocharger in a turbocharged engine is similar to that of an engine running at wide open throttle. During boost from a turbocharger, additional pressure is built up that needs to be relieved.

It is an object of the present invention to provide an improved PCV valve for use in engine systems which have turbochargers.

SUMMARY OF THE INVENTION

A PCV valve in accordance with one aspect of the invention includes a housing member having a through cavity extending axially between opposite ends and a plunger member disposed in the through cavity. The plunger member is adapted to move in the through cavity in opposite axial directions, with a spring member disposed in the through cavity for biasing the plunger member when moved in one of the opposite axial directions. The plunger member has a through opening extending axially between opposite first and second ends. A valve module is disposed in the through opening of the plunger member. The valve module includes a valve body fixed in the through opening, with the valve module having at least one through port. The valve module further includes a valve member moveable axially in a first direction to close off the through opening to the flow of gas and moveable axially in a second direction opposite the first direction to open the through opening to the flow of gas through the at least one through port.

In accordance with another aspect of the invention, the PCV valve can further include a venturi nozzle in the through opening.

In accordance with another aspect of the invention, the plunger member and the venturi nozzle can be molded as a single piece of the same material.

In accordance with another aspect of the invention, the plunger member can be formed having axially extending first and second sections and a flange, with second section being between the first section and the flange. The first section extends to a first end of the plunger member and has an outer first diameter. The second section can be formed having an outer second diameter that is greater than the first diameter. The flange extends to a second end of the plunger member and extends radially outwardly from the second section. The venturi nozzle can be formed adjacent the first end of the plunger member and the valve module can be disposed in the through opening adjacent the second end of the plunger member.

In accordance with another aspect of the invention, the through opening can be formed a generally constant diameter central region extending from the venture nozzle to a first region of the through opening. The first region can be formed having a diameter greater than the central region, with the first region extending to a second region of the through opening. The second region can be formed a diameter greater than the diameter of the first region, and the valve body can be fixed in the second region of the through opening.

In accordance with another aspect of the invention, the second region of the through opening can be formed having an annular groove and the valve body can be snap-fit into the annular groove.

In accordance with another aspect of the invention, the valve member can be disposed in the first region of the through opening between the valve body and the central region of the through opening.

In accordance with another aspect of the invention, the valve body can have a central portion extending axially into the first region of the through opening, with the central portion forming a valve support surface for maintaining the valve member in the first region of the through opening.

In accordance with another aspect of the invention, the valve body can be formed having a plurality of the through ports spaced circumferentially from one another about the central portion.

In accordance with another aspect of the invention, the at least one through port of the valve body can be configured for selective fluid communication with the central region of the through opening.

In accordance with another aspect of the invention, an annular first shoulder can be formed to transition the central region to the first region of the through opening, and the annular first shoulder can be formed to provide a valve seat surface against which the valve member can selectively form a seal to close off the through opening to the flow of gas.

In accordance with another aspect of the invention, a method to facilitate the flow gases to an intake manifold and a turbocharger of an internal combustion engine is provided.

The method includes providing a PCV valve having a housing member with a plunger member disposed therein and configuring the plunger member to move in opposite axial directions within the housing member. Further, providing the plunger member having a through opening extending axially between opposite ends and disposing a valve module in the through opening. Further yet, configuring at least a portion of the valve module to move axially in a first direction to close off the through opening to the flow of gas and to move axially in a second direction opposite the first direction to open the through opening to the flow of gas, such that when the through opening is closed off to the flow of gas, the gas can flow around the plunger member in the first direction to the intake manifold, and when the through opening is open to the flow of gas, the gas can flow through the through opening in the second direction to the turbocharger.

In accordance with another aspect of the invention, the method can further include providing the valve module having a first portion fixed in the through opening of the plunger member and having a second portion movable axially into abutment with a valve seat surface to close off the through opening to the flow of gas therethrough and movable axially out of abutment from the valve seat surface to open the through opening to the flow of gas therethrough.

In accordance with another aspect of the invention, the method can further include forming a venturi nozzle in the through opening of the plunger member.

Additional features and benefits of the present invention will become apparent from the following description of the presently preferred embodiments of the invention when viewed in accordance with the attached drawings and appended claims.

BRIEF DESCRIPTION OF THE DRAWINGS

FIG. 1 is a perspective view of a PCV valve in accordance with a preferred embodiment of the invention.

FIG. 2 is a cross-section of the PCV valve in FIG. 1.

FIG. 2A depicts an enlarged view of the nozzle member as shown in FIG. 2.

FIG. 3 is an expedited view of the components of the PCV valve of FIG. 2.

FIG. 4 is a cross-sectional view taken along lines 4-4 in FIG. 2.

FIG. 5 is a cross-sectional view taken along lines 5-5 in FIG. 2.

FIG. 6 is a cross-sectional view taken along lines 6-6 in FIG. 2.

DESCRIPTION OF PRESENTLY PREFERRED EMBODIMENTS

Figure 7:
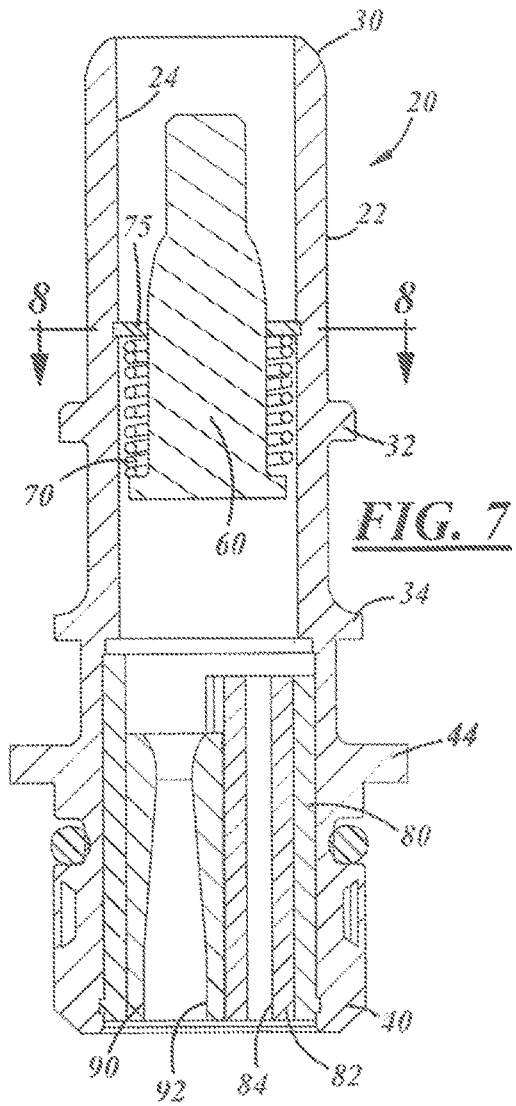
FIG. 7 is another cross-sectional view of a preferred embodiment of the invention when in operation.
Figure 8:
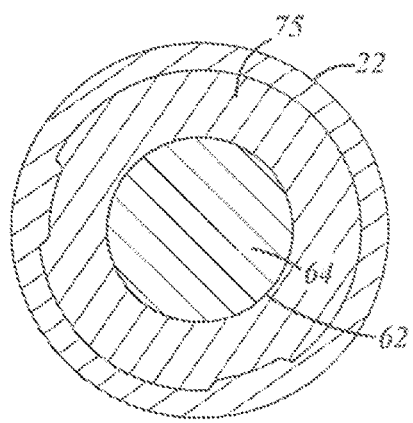
FIG. 8 is a cross-sectional view taken along lines 8-8 in FIG. 7.

FIGS. 1 and 2 depict a preferred embodiment 20 of the PCV valve invention. FIG. 1 is a perspective view highlighting the tubular shape of the PCV housing member 22. FIG. 2 is a cross-sectional view of the PCV valve 20. The housing member 22 is preferably made of plastic in two or more sections, and preferably made by injection molding. The housing 22 has a central elongated cavity or passageway 24. The cavity has a first section 26 and a second section 28. The second section 28 has a larger diameter than the first section 26 for a reason that will become apparent from the description below.

The housing member 22 has a first end 30 which is adapted to be connected to a tube or the like (not shown) for passage of crankcase combustion gases to an intake manifold. For purpose of securely connecting or attaching the housing member at the first end 30 to a tube or the like, a pair of annular flanges 32 and 34 can be provided. It is to be understood, however, that any other conventional ways of connecting or attaching the PCV housing to a manifold can be utilized.

The housing member 22 also has a second end 40 which is adapted to be connected to the crankcase or to another member which is associated with the crankcase or engine. The second end 40 as shown in the drawings is provided with a cam-twist structure 42 for secure connection to a conventional crankcase cover member (not shown).

The second end 40 also has a third annular flange member 44 which is used to assist in securely attaching the PCV valve to the crankcase or other accessory. An O-ring 50 positioned in annular groove 52 is also provided adjacent the second end 40 in order to seal the attachment of the PCV valve to the crankcase or crankcase cover.

In order to assist in securely attaching the PCV valve in place, one or more of the annular flanges can have flattened areas for mating with a wrench or other tool. In the drawings, flange member 34 is depicted as having such flat areas 35 for that purpose.

As shown in the Figures, particularly FIG. 3, the PCV valve includes a housing member 22, a plunger member 60, a spring member 70, a washer member 75, an O-ring member 50, and a co-passageway module 80. These components are also shown in one or more of FIGS. 2 and 4-10 and indicated by the same reference numerals.

The plunger member 60 is preferably made of a metal material, such as cold formed steel, although the plunger member could be made of a plastic material or any other material that would accomplish the same purpose and operation. The member 60 has a body portion 62, a narrower end portion 64 and a lower flange or base member 66. The narrow end portion 64 is provided to fit within the center opening of washer member 75.

It is also to be understood that the form and shape of the plunger and spring assembly shown in the drawings is merely exemplary. There are numerous plunger and spring assemblies for PCV valves known in the art, such as ball and spring mechanisms, which can be used in the present invention.

The washer member 75 is preferably any standard metal washer and is fixedly attached in the sidewall of the housing member 22 in the cavity 26. Preferably, the washer member 75 is insert molded in the housing when the housing is injection molded. It should be noted that the washer could also be made from plastic or other material that fits the function.

The spring member 70 is preferably a metal coil spring as shown in the drawings, but can be any type of biasing member that would accomplish the same purpose and reach the same results.

The base member 66 on the plunger member 60 has a plurality of tab members 68, as particularly shown in FIGS. 3 and 5. The diameter of the base member is also preferably larger than the diameter of the body member 62, although this is not critical. The base member can also be circular or square or any other shape as desired. The tab members 68 are used as a stop for the spring member 70, and also assist in keeping the plunger member 60 centered in the housing cavity. This allows uniform flow of gases around the plunger member 60 and through and around the spring member 70.

Also, as shown in FIG. 5, one or more elongated ridge members 69 are provided inside the housing. These ribs secure the molded in washer more steadfastly, and ensure that the washer stays in location. The ribs also prevent the plunger member 60 from rotating in the housing. Although four tab members 68 and four ridge members 69 are shown, the number is not critical. More or less than four tab members and ridge members 69 can be provided.

The co-passageway module 80 is preferably a plastic molded member that is inserted and positioned in second cavity section 28 in the lower end 40 of the housing member 22. Preferably the module is press-fit in the end 40 of the housing 22. The module 80 has a cylindrical outer shell member and a pair of upstanding passageway members positioned or integrally formed within it. The co-passageway module 80 includes a first passageway member 82. The first passageway member 82 is a hollow tubular member having a central channel or passageway 84 which extends the entire length thereof. The passageway member 82 can be any cross-sectional shape, such as the arcuate shape shown in FIG. 6.

The second passageway member, also referred to as nozzle member 90, similarly has a central channel or passageway 92. In the cross-section of member 90, as shown in FIGS. 2, 2A and 7, the channel 92 is a Venturi-type nozzle. The nozzle or passageway 92 has a radius-shaped inlet end 94, a throat area 95 and a cone-shaped exit end 96.

The nozzle member 90 has a length L as shown in FIG. 2A. The radius-shaped end 94 is less than 50% of the length L, and preferably about 25%. Gases passing through the nozzle member are increased in velocity in the inlet end as they pass through the throat area 95. The velocity of the gases decreases in the cone-shaped exit end 96, preferably to a velocity and pressure substantially the same as the velocity and pressure that the gases had when they entered the inlet end 94.

The nozzle 92 with the throat area acts as a flow restrictor with a controlled response and reinstates the velocity of the gases passing through it without a significant pressure loss.

The nozzle member 90 is shorter in length than the passageway member 82, such that the plunger member cannot seat on it and block passage of gases through it. The structure of the nozzle passage 92 in the nozzle member 90 also prevents or minimizes any differential in pressure between one end or the other as gases pass through it. The nozzle member 90 controls engine bypass gases when the function of the turbocharger increases in magnitude. When the engine runs in normally aspirated mode, the nozzle member 90 provides minimal function. In some situations, it may be necessary to utilize a flow control orifice in place of a nozzle member 90. In those cases, the internal dimensions will change accordingly.

Figure 12:
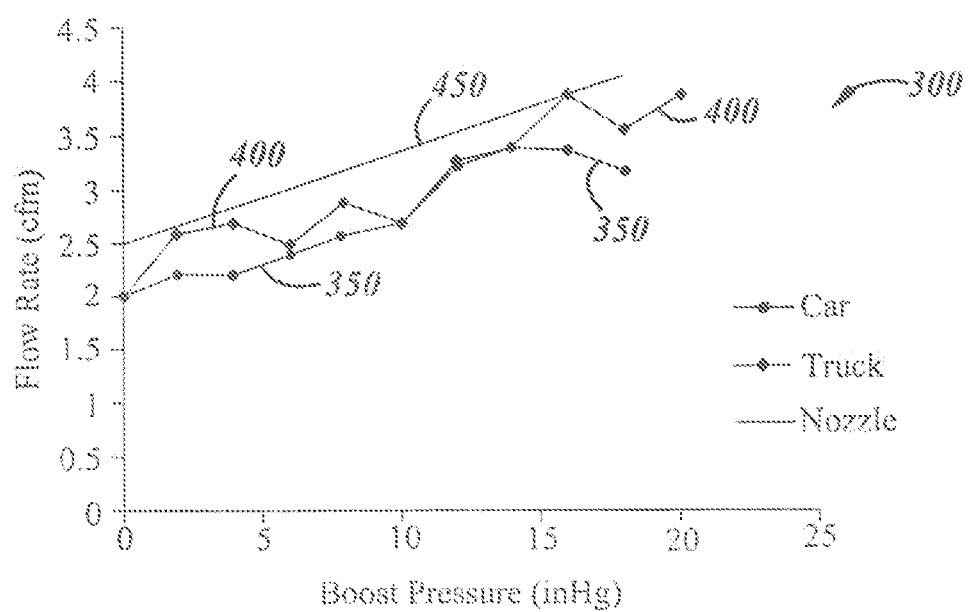
FIG. 12 is a graph depicting flow rates.

The size of the flow nozzle member 90 is selected depending on the blowby data and flow curve utilized for the vehicle or vehicles with which the PCV valve will be used. A graph 300 depicting blowby flow curve data for representative vehicles is shown in FIG. 12. The flow curve relative to cars is shown by line 350, and the flow curve relative to trucks is shown by line 400. The reverse flow required for the nozzle member 90 is shown by line 450. Based on this data and shape of the flow curves, a flow nozzle with a throat size of 0.087 inches would meet the flow requirement.

It is also possible in an alternate embodiment to provide a module with a nozzle member and an opening in a plate member adjacent the plunger member, such that the plunger member can cover and seal the opening in the plate member.

The basic operation of the biased plunger member and washer are similar to conventional PCV valves. The PCV valve 20 acts to restrict and meter the flow of gases passing through it. When the pressure of the crankcase gases are more than the pressures of the gases at the intake manifold, a vacuum is created which moves the plunger toward the inlet end 30 of the housing. With a significant difference in the pressures, the plunger compresses the spring member against the washer member and restricts and limits the amount of the gases which can pass through the valve. This prevents too much air being added to the intake manifold and causing the fuel/air mixture to be too lean.

Figure 9:
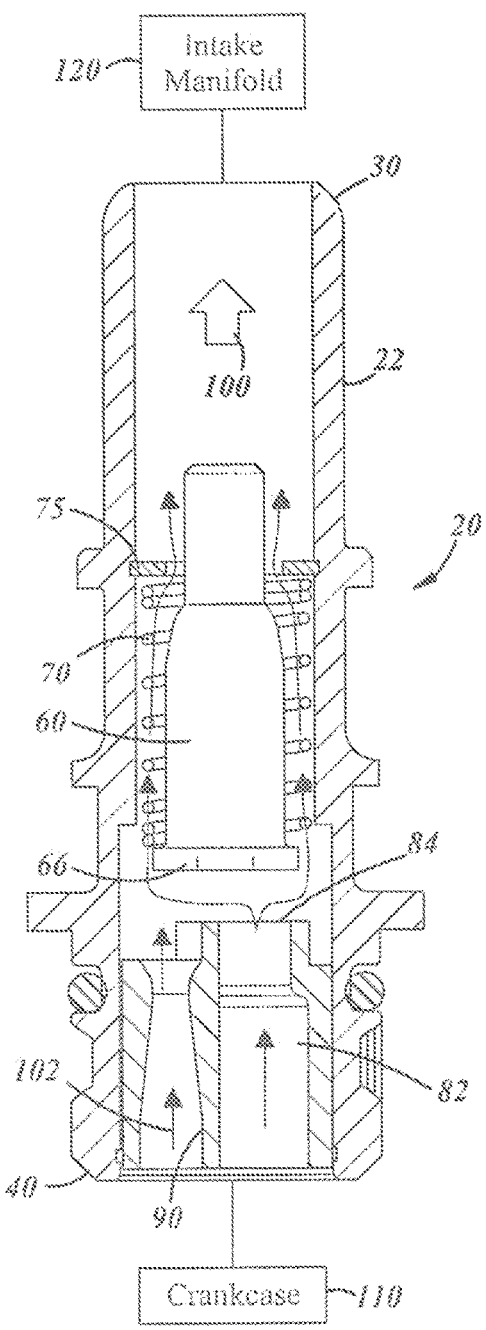
FIGS. 9 and 10 are additional cross-sectional views of an embodiment of the invention in different operational situations.
Figure 10:
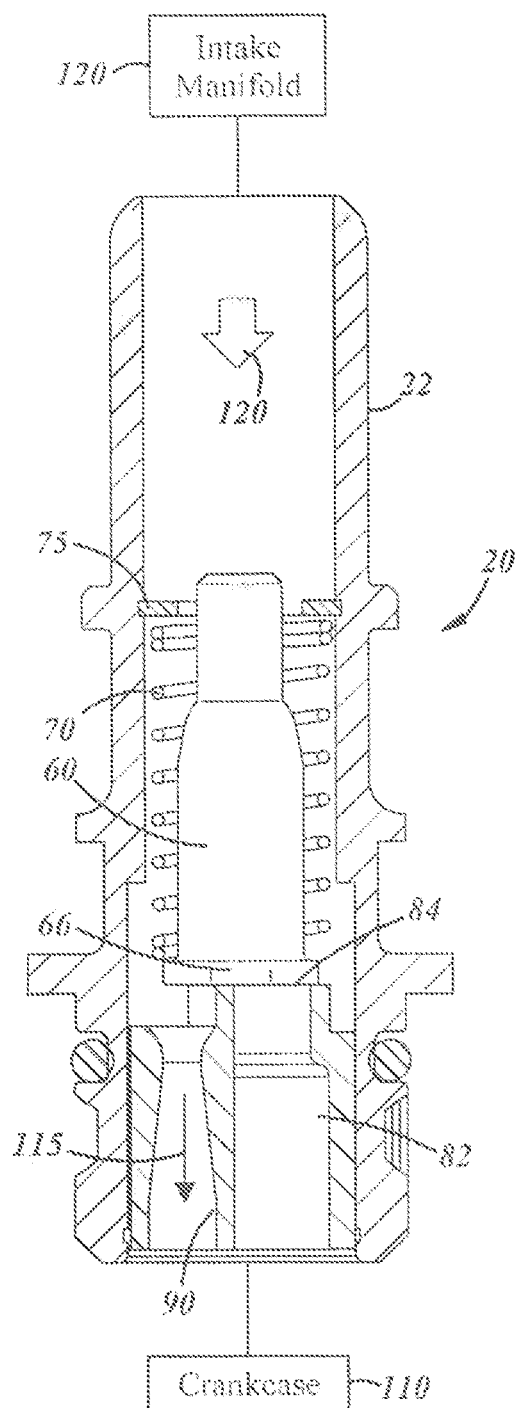

FIGS. 9 and 10 depict two different points in time in the operation of the disclosed embodiment of the invention. In FIG. 9, the plunger member 60 has been moved in the direction of the arrow 100 due to the differential difference in pressure between the crankcase 110 and the intake manifold 120. The higher pressure in the crankcase has pushed the plunger against the bias of the spring member toward the intake manifold. This also opens the channel 84 in the passageway member 82 by moving the base 66 of the plunger member away from the opening of the passageway 84. In this condition, all of the passage of gases through the PCV valve are in the direction of the arrow 100.

As indicated by arrow 102 in FIG. 9, some of the gases may also be passing through the passage in the nozzle member 90. These will be in the same direction as arrow 100.

In FIG. 10, the pressure differential between the crankcase and intake manifold is minimal or non-existent. As such, the plunger member 60 is positioned (or seated) firmly on the end of the passageway member 82 and blocking the channel 84. Under this condition, a backflow of gas can flow back through the PCV valve when the turbocharger is operating, or when there is a boost of air from the turbocharger. In this situation, the passage of gases flow through the nozzle member 90, as shown by arrow 115. The PCV valve in accordance with the invention thus can restrict and modulate the flow of gases between the crankcase and intake manifold, and can also monitor and control the flow of gases resulting from use of a turbocharger.

Figure 11:
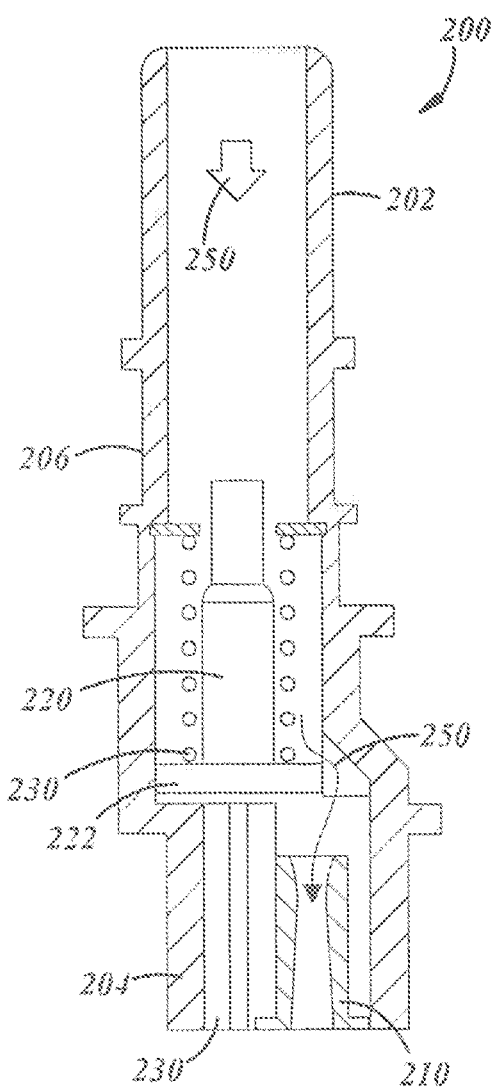
FIG. 11 depicts another embodiment of the invention.

FIG. 11 depicts an alternate PCV embodiment 200 in accordance with the invention. In this embodiment, the housing member 202 has an auxiliary housing member 204 added on the end of the tubular member 206. The auxiliary housing member 204 houses a nozzle member 210 which is the same as the nozzle member 90 described above.

The plunger member 220 and its operation are the same as that of plunger member 60 described above. A biasing spring member 230 assists in the operation of the plunger member. The base 222 of the plunger member seats on the open end of passageway member 230, which preferably is substantially the same as passageway member 82 described above.

The airflow around the plunger member caused by operation of a turbocharger is indicated by arrow 250.

Figure 13:
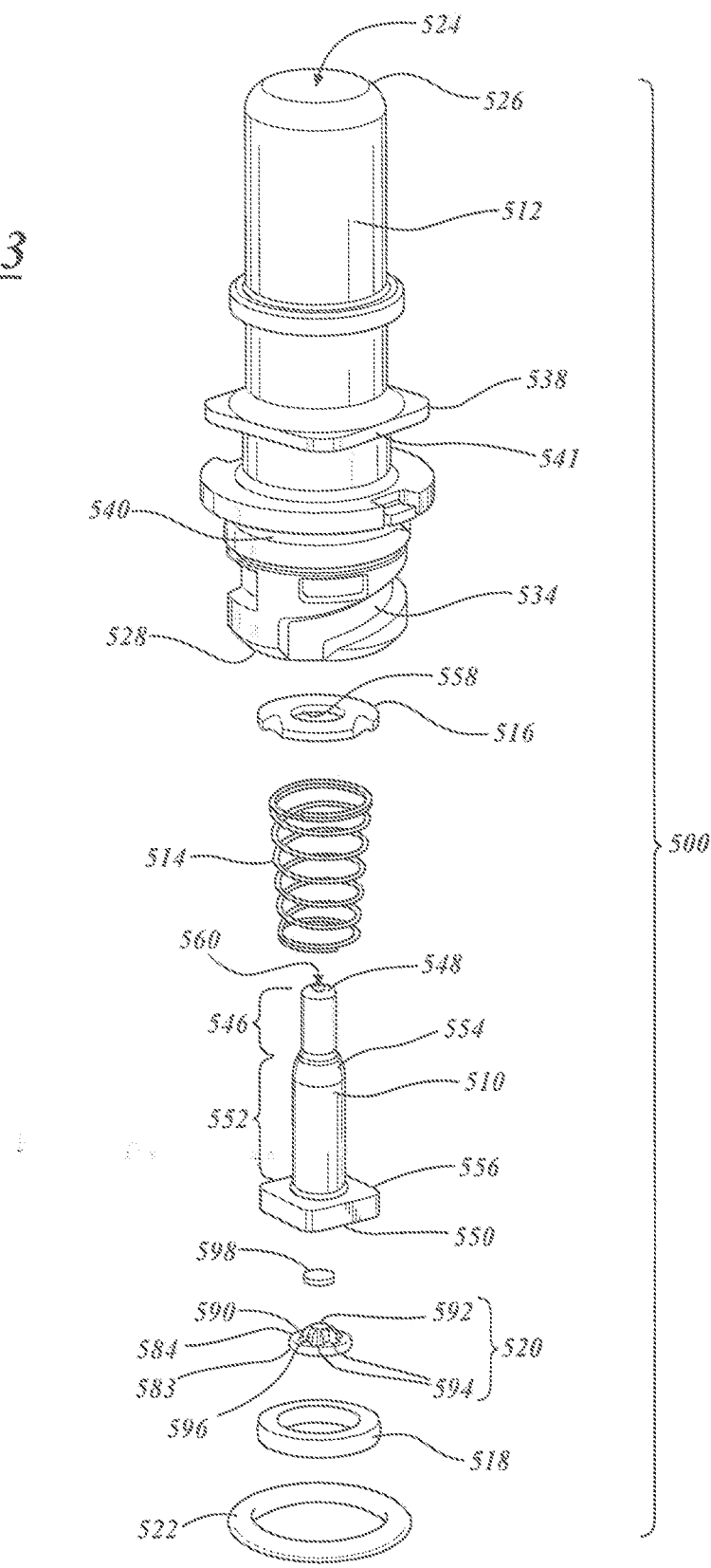
FIG. 13 depicts an exploded view of another embodiment of the invention.

FIG. 13 depicts an alternate PCV valve 500 in accordance with another aspect of the invention. In this embodiment, the function of the co-passageway module 82 discussed above with regard to the PCV valve 20 is wholly or substantially contained within a plunger member 510 of the assembly 500, thereby simplifying manufacture and assembly of the PCV valve 500 and rendering the PCV valve 500 universal to a variety of vehicle platforms, whether having turbochargers or not. The PCV valve 500 includes a housing member, referred to hereafter as housing 512, a spring member 514, a washer member 516, an O-ring member 518, a turbo valve module 520, a retainer ring 522, and the plunger member 510.

The housing 512 is preferably made of plastic, such as via an injection molding process, by way of example and without limitation, though any desired plastic forming/molding process can be used. The housing 512 has a central elongated through passageway or cavity 524 extending axially between opposite first and second ends 526, 528. The cavity has a first section 530 extending from the first end 526 toward the second end 528 and a second section 532 extending from the second end 528 toward the first end 526, wherein the first and second sections 530, 532 transition to one another at an annular shoulder 534 within the cavity 524. The second section 532 has a larger diameter than the first section 530 to accommodate reciprocating movement of the plunger member 510 therein.

The first end 526 is configured for connection to a tube or the like (not shown) to facilitate the passage of crankcase combustion gases to an intake manifold and the second end 528 is configured for connection to a valve cover or the crankcase or to another member which is associated with the crankcase or engine. The second end 528 is provided with a cam-twist structure 536 for secure connection to a conventional valve cover member (not shown), and also has an annular flange member 538 which is used to assist in securely attaching the PCV valve to the crankcase or other accessory. The O-ring member 518 is positioned in an outer annular groove 540 that is provided adjacent the second end 528 to facilitate sealing the attachment of the PCV valve 500 to the crankcase or crankcase cover. To assist in securely attaching the PCV valve 500 within the opening of the engine component, one or more of the annular flanges can have flattened areas for mating with a wrench or other tool, wherein flange member 538 is depicted as having such flat areas 541 for such purpose. Accordingly, the housing 512 is generally the same as discussed above for the PCV valve 20.

The washer member 516 is preferably any standard metal washer and is fixedly attached in a sidewall 542 bounding the cavity 524 of the housing 512. Preferably, the washer member 516 is insert molded in the housing 512 when the housing 512 is molded. It should be noted that the washer member 516 could also be made from plastic or other material that fits the function. Further yet, it is to be recognized that the washer member 516 could be snap fit into a groove or other captured or fixed against the shoulder 534, such as via an adhesive or weld, for example.

The plunger member 510 is disposed in the through cavity 524 of the housing 512 and is preferably made of an injection molded plastic material or any other material that would accomplish the same purpose and operation. The plunger member 510 has an outer surface shaped generally the same as discussed above for the plunger member 60 shown in FIG. 2. As such, the plunger member 510 includes a body portion 544 having a reduced diameter end portion 546 extending from a first end 548 toward a second end 550 and an enlarged diameter portion 552 extending from adjacent the second end 550 toward the first end 548. The reduced diameter portion 546 and enlarged diameter portion 552 transition to one another via an generally convex shoulder 554. A lower flange or base member 556, shown in FIG. 13 as being generally square with rounded corners, extends radially outwardly from the enlarged diameter portion 552 at the second end 550. The reduced diameter portion 546 is sized to fit within a center opening 558 of the washer member 516, and the enlarged diameter portion 552 is sized to close off the opening 558 when extended therethrough or brought into contact therewith. Accordingly, up to this point the plunger member 510 is generally the same as discussed above for the plunger member 60; however, a notable difference is that the plunger member 512 is hollow, having a through passage, also referred to as through opening 560, extending axially between the opposite first and second ends 548, 550.

The through opening 560 forms a venturi nozzle 562, preferably molded in the material of the plunger member 510 as a single piece of the same material therewith, adjacent the first end 548, having an enlarged diameter inlet end 564, a central reduced diameter throat region 566, and an enlarged diameter exit or outlet end 568. One skilled in the art of fluid and gas flow recognizes the function of a venturi nozzle, having a reduced diameter section (necked-down region) to increase the velocity and reduce the pressure of the fluid/gas flowing therethrough, and thus, further description herein is not necessary. The through opening 560 extends over a central region 570 from the venturi nozzle 562 toward the second end 550, wherein the central region has a generally constant diameter corresponding in size with the diameter of the exit end 568 of the venturi nozzle 562. The central region 570 transitions to an enlarged diameter first region 572 having a larger diameter than the central region 570, wherein a radially outwardly extending, annular first shoulder 574 extends from the central region 570 to the first region 572, thereby forming a floor of the first region 572. The first shoulder 574 can be formed to provide a generally flat, annular valve seat surface or it can otherwise be formed to provide an axially extending, raised annular valve seat surface 576 immediately adjacent the central region 570, with the function of the valve seat surface 576 being discussed further hereafter. The first region 572 transitions to an enlarged diameter second region 578 within the lower flange 556. The second region 578 has a larger diameter than the first region 572, wherein a radially outwardly extending, annular second shoulder 580 extends from the first region 572 to the second region 578, thereby forming a floor of the second region 578. The second region 578 extends to the second end 550, wherein an annular inner surface bounding the second region 578 can be formed having an annular concave recess, referred to hereafter as groove 582, to facilitate retaining the turbo-valve module 520 within the second region 578 of the through opening 560.

The turbo-valve module 520 includes a valve body 583 that is generally shaped for fixed receipt in the first region 572, and further shown as extending into the second regions 578 of the through opening 560, beneath and axially aligned with the central region 570 of the through opening 560. The valve body 583 has an annular outer peripheral portion 584 having outer periphery preferably sized for a snap-fit into the annular groove 582 in the second region 578 of the through opening 560. It is to be recognized that other mechanisms than a snap-fit are contemplated herein, including secondary fasteners, such as a snap-ring, adhesive, weld, or otherwise; however, the aforementioned snap-fit is believed to be most economical in both assembly and component cost. Upon the valve body 583 being fixed in the plunger member 510, the plunger member 510 and turbo-valve module 520 form an integral subassembly.

The outer peripheral portion 584 is shown as forming a portion of a first side of the module 520, also referred to as first face 586 in combination with a central portion 588 of the module 520, wherein the first face 586 is planar or generally planar. The outer peripheral portion 584 also forms a portion of a second face 590, facing axially away from the first face 586, in combination with the central portion 588; however, the second face 590 is shown as having a generally raised, dome-shaped geometry, unlike the generally flat geometry formed by the first face 586, such that the central portion 588 extends axially outwardly, beyond the outer peripheral portion 584 to form a valve support surface 592 that is centrally located in concentric relation to the outer periphery 584. To allow gas to selectively pass through the body 583 of the turbo valve module 520, at least one, and shown as a plurality of through ports 594 extend axially through the first and second faces 586, 590. The through ports 594 are shown as being circumferentially spaced equidistantly from one another by intervening ribs, also referred to as spokes 596. As such, the central portion 588 is generally cylindrical, having an axially extending length that is greater than the axially extending length of the outer peripheral portion 585, wherein the central portion 588 is fixed to the outer peripheral portion 585 via the spokes 596.

The valve support surface 592 is flat or generally flat and extends generally parallel to the first face 586. The central portion 588 and valve support surface 592 at the end thereof have a sufficient diameter to support a valve member 598 of the valve module 520 thereon, and preferably having a diameter slightly greater than the diameter of the central region 570 of the through opening 560, such that the valve support surface 592 is prevented from entering the central region 570. However, the central portion 588 has a diameter less than the diameter of the first region 572 of the through opening 560, such that the through ports 594 are received, at least in part, and extend into the first region 572.

The valve member 598 is provided of any suitable material capable of establishing a fluid/gas tight seal against the valve seat surface 576, such as a flexible elastomeric material, by way of example and without limitation. The valve member 598 is provided as a generally flat circular disc having a diameter at least slightly greater than the diameter of the central region 570 of the through opening 560, such that the valve member 598 is prevented from fully entering the central region 570, thereby being assured of being able to seal-off the central region 570 when desired. However, the valve member 598 has a diameter less than the diameter of the first region 572 of the through opening 560 such that, when the valve member 598 is not seated against the valve seat surface 576, gas can flow freely past and about the valve member 598 and through the through ports 594.

The spring member 514 is preferably a metal coil spring as shown in the drawings, but can be any type of biasing member that would accomplish the same purpose and reach the same results, which are discussed above with regard to the PCV valve 20. Upon being assembled, the spring member 514 is captured between washer member 516 and the lower flange 556 of the plunger member 510, wherein the plunger member 510 and turbo-valve module 520, retained therein, are fixed within the cavity 524 of the housing 512, against removal therefrom, via the retainer ring 522, which is preferably snap-fit into an annular groove 600 adjacent an end of the second section 532 of the cavity 524.

Figure 14A:
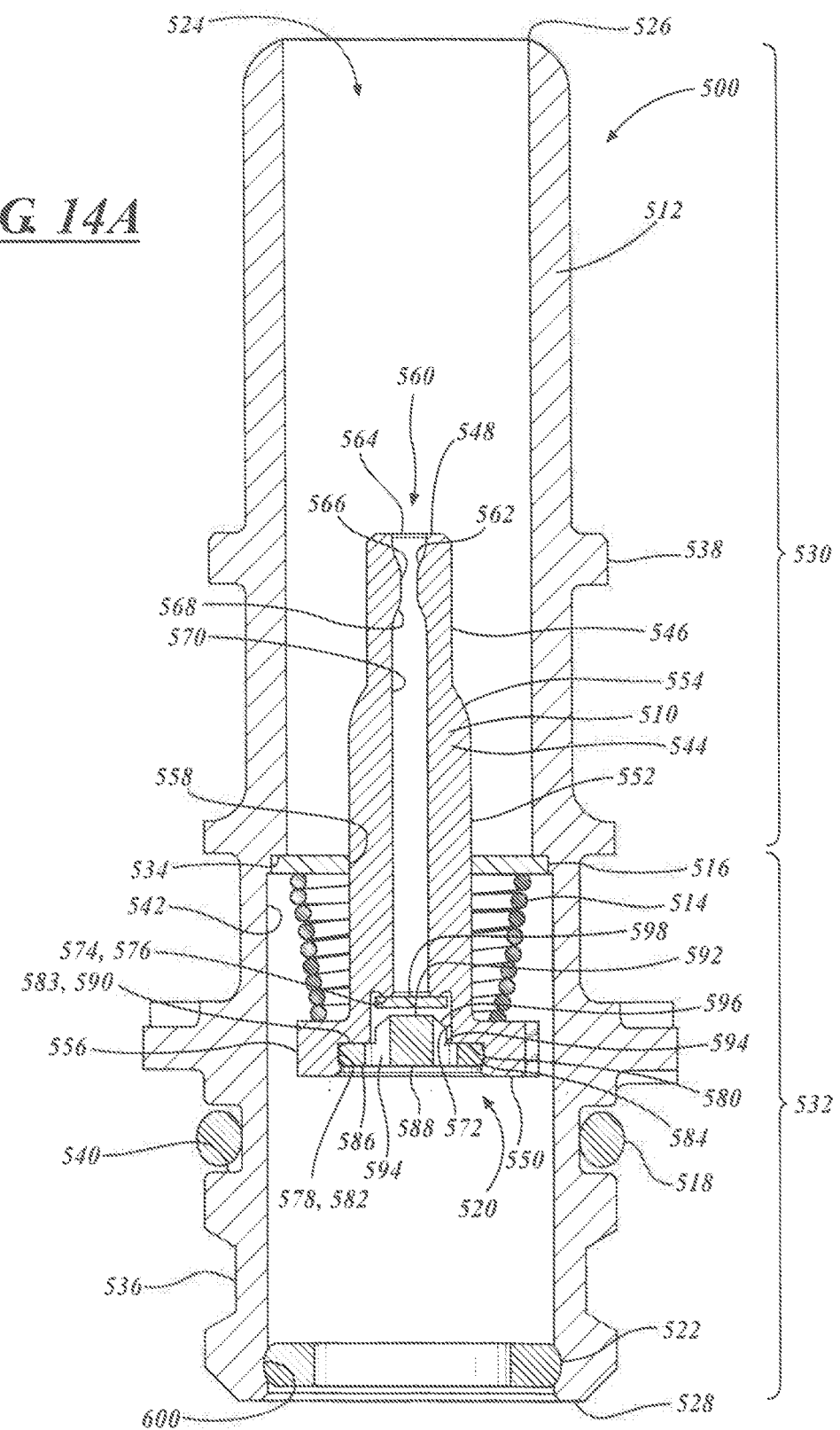
FIGS. 14A-14C depict cross-sectional views of the embodiment of FIG. 13 shown in different operation situations.
Figure 14B:
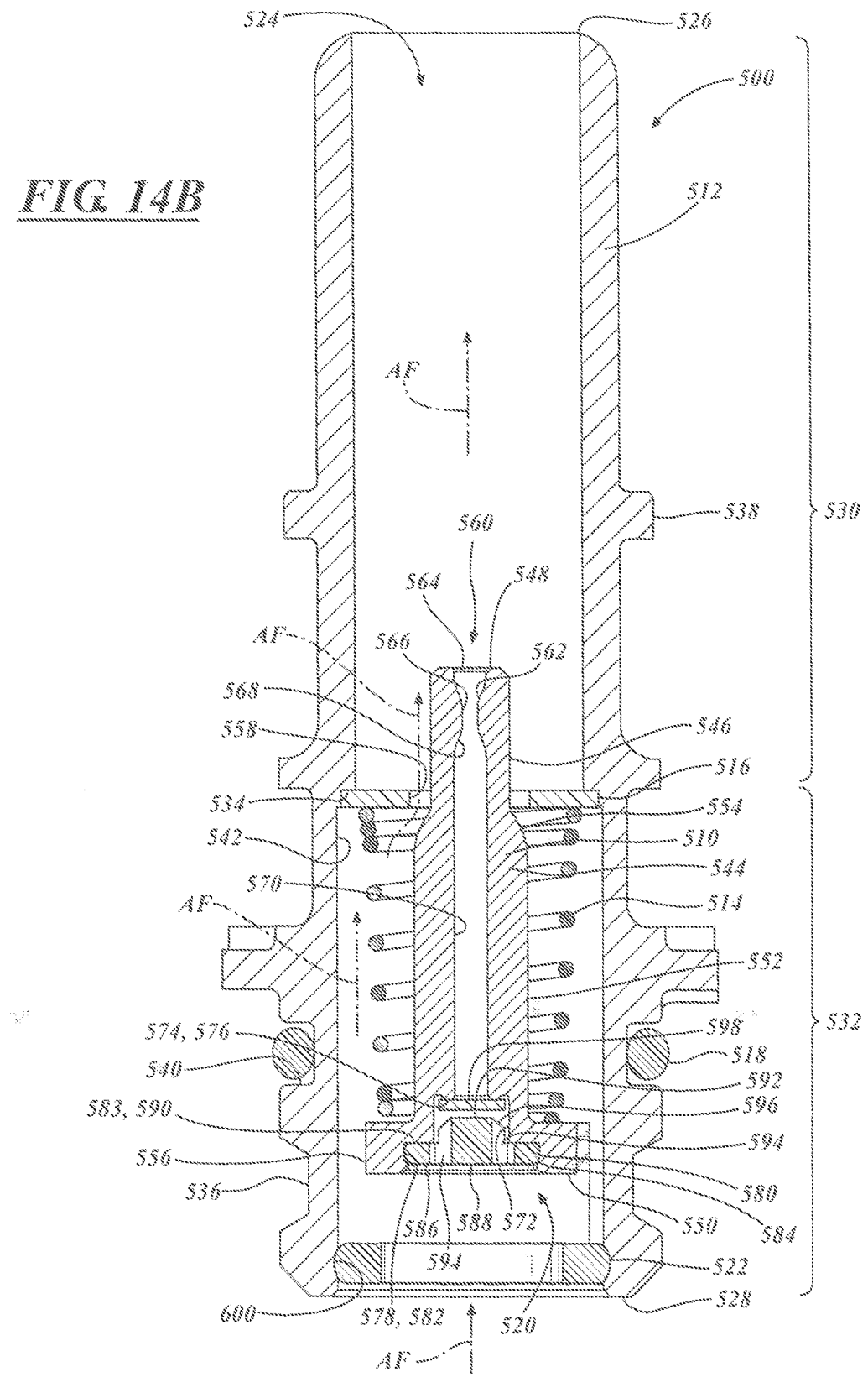
Figure 14C:
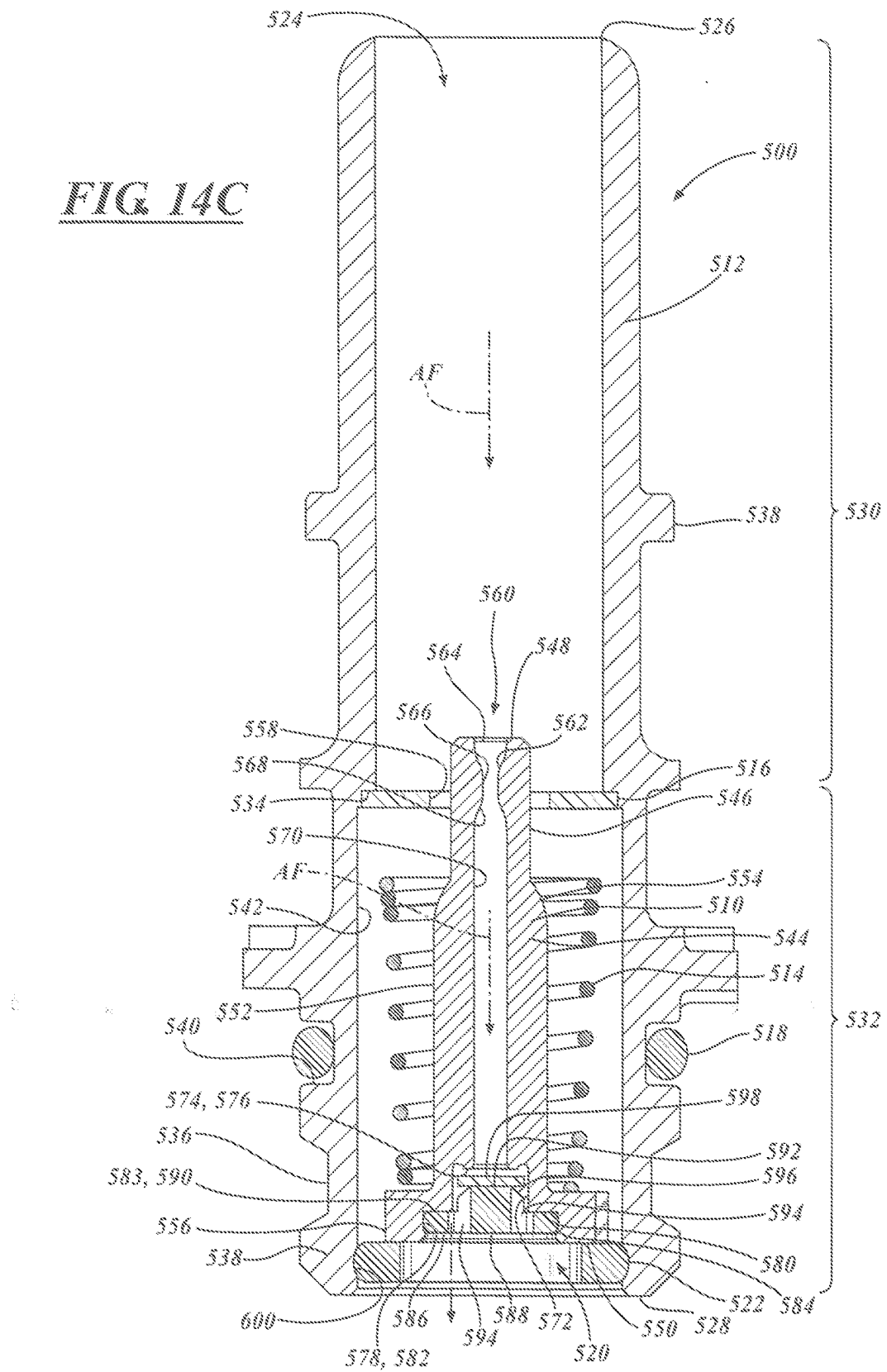

In operation, the integral subassembly of the PCV valve 500 is capable of responding to different operating situations without need for additional valve members, as shown in FIGS. 14A-14C. In FIG. 14A, an engine running at idle situation is shown wherein the PCV valve 500 is automatically caused to actuate/move to an idle operating position via pressure differentials between the crankcase and the intake manifold. When the vehicle is at idle, the pressure is significantly increased relative to the pressure in the intake manifold, and thus, the high pressure acts on the plunger member 510 causing the plunger member 510 to move in a first axial direction against the bias of the spring member 514 to close-off or substantially close-off the center opening 558 of the washer member 516. In addition, the valve member 598 lifts off the valve support surface 592 of the turbo-valve module central portion 588 under the high pressure from the crankcase and moves axially in a first direction into seal abutment with the valve seat surface 576, thereby closing off the central region 570 to the flow of gas therethrough.

Then, in FIG. 14B, an engine running in a normal operating situation is shown wherein the PCV valve 500 is automatically caused to actuate/move to a normal operating position via only slight pressure differentials between the crankcase and the intake manifold. When the vehicle is running in normal operating mode, the pressure within the crankcase is only slightly greater than the pressure in the intake manifold, and thus, the plunger member 510 is caused to move axially to a position that is out of sealed engagement with the retainer ring 522; however, the pressure differential is not sufficient to move the plunger member 510 axially against the bias of the spring member 514 to an extent to close-off the center opening 558 of the washer member 516. As such, gas is free to flow along an airflow direction AF through the retainer ring 552 and about the plunger member 510 and then through the center opening 558 of the washer member 516 and into the intake manifold, wherein the gases can be burned by the engine. In addition, in the normal operating mode, the valve member 598 is caused to lift off the valve support surface 592 of the turbo-valve module central portion 588 under the pressure from the crankcase and moves axially in the first direction into seal abutment with the valve seat surface 576, thereby closing off the central region 570 to the flow of gas therethrough. Accordingly, in the normal operating mode, all the gas flowing from the crankcase is caused to flow around the plunger member 510.

Then, in FIG. 14C, an engine running in a high demand, high performance operating situation is shown, such as when an accelerator is depressed sufficiently to cause sudden acceleration, wherein the PCV valve 500 is automatically caused to actuate/move to a boost operating position via pressure differentials between the crankcase and the intake manifold, wherein the pressure within the intake manifold may be slightly greater than the pressure within the crankcase. In this condition, the plunger member 510 is caused to move axially downwardly in a second direction opposite the first direction discussed above into sealed engagement with the retainer ring 522, and thus, gas is unable to flow in an airflow direction AF about the plunger member 510 through the washer center opening 558; however, the valve member 598 is caused to move axially in a second direction opposite the first direction away from and out of sealed abutment with the valve seat surface 576 and into abutment with the valve support surface 592 of the turbo-valve module central portion 588. Accordingly, gas is able to freely flow from above the PCV valve 500 downwardly, as viewed in FIG. 14C, through the venturi nozzle 562, through the central region 570, around the valve member 598 and through the ports 594 into the crankcase, whereupon the gas within the crankcase can be routed to the turbocharger for enhanced engine performance.

Accordingly, the entirety of the turbo-valve module 520 is able to be contained within the body of the plunger member 510, with a minimum number of parts associated therewith, thus, greatly simplifying assembly and reducing cost associate with the manufacture and assembly of the PCV valve 500.

While preferred embodiments of the present invention have been shown and described herein, numerous variations and alternative embodiments will occur to those skilled in the art. Accordingly, it is intended that the invention is not limited to the preferred embodiments described herein but instead limited to the terms of the appended claims.

What is claimed is:

1. A PCV valve, comprising:
    a housing member having a through cavity extending axially between opposite ends;
    a plunger member disposed in said through cavity, said plunger member being adapted to move in said through cavity in opposite axial directions, said plunger member having through opening extending axially between opposite first and second ends;
    a spring member disposed in said through cavity for biasing said plunger member when moved in one of the opposite axial directions; and
    a valve module disposed in said through opening of said plunger member, said valve module including a valve body fixed in said through opening and having at least one through port, said valve module including a valve member moveable axially in a first direction to close off said through opening to a flow of gas and moveable axially in a second direction opposite the first direction to open said through opening to the flow of gas through said at least one through port, wherein said valve body has a plurality of said through ports spaced circumferentially from one another.

2. The PCV valve of claim 1, further including a venturi nozzle in said through opening.

3. The PCV valve of claim 2, wherein said plunger member and said venturi nozzle are molded as a single piece of the same material.

4. The PCV valve of claim 2, wherein said plunger member has axially extending first and second sections and a flange, said second section being between said first section and said flange, said first section extending to a first end of said plunger member and having an outer first diameter, said second section having an outer second diameter that is greater than said first diameter, said flange extending to a second end of said plunger member and extending radially outwardly from said second section, said venturi nozzle being formed adjacent said first end of said plunger member and said valve module being disposed in said through opening adjacent said second end of said plunger member.

5. The PCV valve of claim 4, wherein said through opening has a generally constant diameter central region extending from said venture nozzle to a first region of said through opening, said first region having a diameter greater than said central region, said first region extending to a second region of said through opening, said second region having a diameter greater than said diameter of said first region, said valve body being fixed in said second region of said through opening.

6. The PCV valve of claim 5, wherein said second region has an annular groove, said valve body being snap-fit into said annular groove.

7. The PCV valve of claim 6, wherein said valve member is disposed in said first region of said through opening.

8. The PCV valve of claim 7, wherein said valve body has a central portion extending axially into said first region of said through opening, said central portion forming valve support surface for maintaining said valve member in said first region of said through opening.

9. The PCV valve of claim 8, wherein said valve body has a plurality of said through ports spaced circumferentially from one another about said central portion.

10. The PCV valve of claim 5, wherein said at least one through port of said valve body is configured for selective fluid communication with said central region of said through opening.

11. The PCV valve of claim 5, wherein an annular first shoulder transitions said central region to said first region, said annular first shoulder forming a valve seat surface against which said valve member selectively forms a seal to close off said through opening to the flow of gas.

12. A PCV valve, comprising:
    a housing member having a through cavity extending axially between opposite ends;
    a plunger member disposed in said through cavity, said plunger member being adapted to move in said through cavity in opposite axial directions, said plunger member having through opening extending axially between opposite first and second ends;
    a spring member disposed in said through cavity for biasing said plunger member when moved in one of the opposite axial directions; and
    a valve module disposed in said through opening of said plunger member, said valve module including a valve body fixed in said through opening and having at least one through port, said valve module including a valve member moveable axially in a first direction to close off said through opening to a flow of gas and moveable axially in a second direction opposite the first direction to open said through opening to the flow of gas through said at least one through port, wherein said through opening has a venture nozzle adjacent said first end and a generally constant diameter central region extending from said venture nozzle to a first region having a first diameter greater than the diameter of said central region, said first region extending to a second region having a second diameter greater than said first diameter of said first region, said valve body being fixed in said through opening adjacent said second end.

13. The PCV valve of claim 12, wherein said valve body is snap-fit into said plunger member.

14. The PCV valve of claim 12, wherein said valve body is disposed in said first and second regions of said through opening.

15. The PCV valve of claim 14, wherein said valve body has a central portion extending axially into said first region of said through opening, said central portion forming valve support surface for maintaining said valve member in said first region of said through opening.

16. The PCV valve of claim 15, wherein said valve body has a plurality of said through ports spaced circumferentially from one another about said central portion.

17. The PCV valve of claim 12, wherein an annular first shoulder transitions said central region to said first region, said annular first shoulder forming a valve seat surface against which said valve member selectively forms a seal to close off said through opening to the flow of gas.

18. The PCV valve of claim 1 arranged to facilitate the flow of gas to an intake manifold and a turbocharger of an internal combustion engine, wherein movement of said valve member to close said through opening permits the flow of gas around said plunger to the intake manifold, and wherein movement of said valve member to open said through opening permits the flow of gas through said through opening to the turbocharger.

19. The PCV valve of claim 12 arranged to facilitate the flow of gas to an intake manifold and a turbocharger of an internal combustion engine, wherein movement of said valve member to close said through opening permits the flow of gas around said plunger to the intake manifold, and wherein movement of said valve member to open said through opening permits the flow of gas through said through opening to the turbocharger.

20. A PCV valve, comprising:
   a housing member having a through cavity extending axially between opposite ends;
   a plunger member disposed in said through cavity, said plunger member being adapted to move in said through cavity in opposite axial directions, said plunger member having through opening extending axially between opposite first and second ends and a venture nozzle in said through opening;
   a spring member disposed in said through cavity for biasing said plunger member when moved in one of the opposite axial directions; and
   a valve module disposed in said through opening of said plunger member, said valve module including a valve body fixed in said through opening and having at least one through port, said valve module including a valve member moveable axially in a first direction to close off said through opening to a flow of gas and moveable axially in a second direction opposite the first direction to open said through opening to the flow of gas through said at least one through port,
   wherein said plunger member has axially extending first and second sections and a flange, said second section being between said first section and said flange, said first section extending to a first end of said plunger member and having an outer first diameter, said second section having an outer second diameter that is greater than said first diameter, said flange extending to a second end of said plunger member and extending radially outwardly from said second section, said venturi nozzle being formed adjacent said first end of said plunger member and said valve module being disposed in said through opening adjacent said second end of said plunger member.

* * * * *